(12) United States Patent
Condamin et al.

(10) Patent No.: US 11,040,638 B2
(45) Date of Patent: Jun. 22, 2021

(54) TRACK ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/399,116

(22) Filed: Apr. 30, 2019

(65) Prior Publication Data

US 2019/0337417 A1 Nov. 7, 2019

Related U.S. Application Data

(63) Continuation-in-part of application No. 16/131,360, filed on Sep. 14, 2018, now Pat. No. 10,759,308, and (Continued)

(30) Foreign Application Priority Data

May 4, 2018 (FR) ..................................... 1853891
May 4, 2018 (FR) ..................................... 1853892
(Continued)

(51) Int. Cl.
*F16M 13/00* (2006.01)
*B60N 2/07* (2006.01)
(Continued)

(52) U.S. Cl.
CPC ......... *B60N 2/0722* (2013.01); *B60N 2/0818* (2013.01); *B60N 2/0843* (2013.01); *B60N 2/20* (2013.01); *B60R 22/22* (2013.01)

(58) Field of Classification Search
CPC ...... B60N 2/0722; B60N 2/20; B60N 2/0818; B60N 2/0843; B60R 22/22
See application file for complete search history.

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 9/2013
CN 203799201 U 8/2014
(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Amy J. Sterling
(74) *Attorney, Agent, or Firm* — Fishman Stewart PLLC (57) ABSTRACT

A track assembly includes a track and a support member. The support member may include a slider and/or an electrical connector. The slider may be configured to move longitudinally to move the electrical connector between a first rotational position and/or a second rotational position. In the first position of the electrical connector, the electrical connector may be in electrical contact with the track. In the second position of the electrical connector, the electrical connector may not be in electrical contact with the track. The electrical connector may include a cam, and/or the cam may be configured to contact the slider. Longitudinal movement of the slider may rotate the cam to move the electrical connector between the first rotational position and/or the second rotational position. The slider may include a first
(Continued)

ramped portion and/or a second ramped portion that may be configured to contact the slider.

20 Claims, 7 Drawing Sheets

Related U.S. Application Data a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, and a continuation-in-part of application No. 16/131,614, filed on Sep. 14, 2018, now Pat. No. 10,850,645, which is a continuation of application No. 16/131,384, filed on Sep. 14, 2018, now Pat. No. 10,889,208.

(30) Foreign Application Priority Data

May 4, 2018 (FR) ........................... 1853893
May 4, 2018 (FR) ........................... 1853894

(51) Int. Cl.
*B60N 2/20* (2006.01)
*B60N 2/08* (2006.01)
*B60R 22/22* (2006.01)

(56) References Cited

U.S. PATENT DOCUMENTS

| | | | |
|---|---|---|---|
| 2,480,622 A | 8/1949 | Warnock | |
| 2,678,082 A | 5/1954 | Nathan | |
| 3,181,102 A | 4/1965 | Fehr | |
| 3,213,403 A | 10/1965 | Hermann | |
| 3,268,848 A | 8/1966 | Adams | |
| 3,603,918 A | 9/1971 | Woertz | |
| 3,933,403 A | 1/1976 | Rubesamen et al. | |
| 3,940,182 A | 2/1976 | Tamura | |
| 4,020,769 A | 5/1977 | Keir | |
| 4,198,025 A | 4/1980 | Lowe et al. | |
| 4,243,248 A | 1/1981 | Scholz et al. | |
| 4,282,631 A | 8/1981 | Uehara et al. | |
| 4,511,187 A | 4/1985 | Rees | |
| 4,575,295 A | 3/1986 | Rebentisch | |
| 4,618,808 A | 10/1986 | Ish-Shalom et al. | |
| 4,707,030 A | 11/1987 | Harding | |
| 4,711,589 A | 12/1987 | Goodbred | |
| 4,763,360 A | 8/1988 | Daniels et al. | |
| 4,776,809 A | 10/1988 | Hall | |
| 4,830,531 A | 5/1989 | Condit et al. | |
| 4,853,555 A | 8/1989 | Wheat | |
| 4,961,559 A | 10/1990 | Raymor | |
| 4,969,621 A | 11/1990 | Munchow et al. | |
| 4,987,316 A | 1/1991 | White et al. | |
| 5,137,331 A | 8/1992 | Colozza | |
| 5,167,393 A | 12/1992 | Hayakawa et al. | |
| 5,192,045 A | 3/1993 | Yamada et al. | |
| 5,222,814 A | 6/1993 | Boelryk | |
| 5,322,982 A | 6/1994 | Leger et al. | |
| 5,332,290 A | 7/1994 | Borlinghaus et al. | |
| 5,348,373 A | 9/1994 | Stiennon | |
| 5,362,241 A | 11/1994 | Matsuoka et al. | |
| 5,446,442 A | 8/1995 | Swart et al. | |
| 5,466,892 A | 11/1995 | Howard et al. | |
| 5,489,173 A | 2/1996 | Hofle | |
| 5,582,381 A | 12/1996 | Graf et al. | |
| 5,599,086 A | 2/1997 | Dutta | |
| 5,618,192 A | 4/1997 | Drury | |
| 5,655,816 A | 8/1997 | Magnuson et al. | |
| 5,676,341 A | 10/1997 | Tarusawa et al. | |
| 5,696,409 A | 12/1997 | Handman et al. | |
| 5,701,037 A | 12/1997 | Weber et al. | |
| 5,796,177 A | 8/1998 | Werbelow et al. | |
| 5,800,015 A | 9/1998 | Tsuchiya et al. | |
| 5,899,532 A | 5/1999 | Paisley et al. | |
| 5,918,847 A | 7/1999 | Couasnon | |
| 5,921,606 A | 7/1999 | Moradell et al. | |
| 5,964,442 A | 10/1999 | Wingblad et al. | |
| 5,964,815 A | 10/1999 | Wallace et al. | |
| 6,036,157 A | 3/2000 | Baroin et al. | |
| 6,142,718 A | 11/2000 | Kroll | |
| 6,150,774 A | 11/2000 | Mueller et al. | |
| 6,166,451 A | 12/2000 | Pigott | |
| 6,216,995 B1 * | 4/2001 | Koester | B60N 2/0228 248/429 |
| 6,227,595 B1 | 5/2001 | Hamelin et al. | |
| 6,290,516 B1 | 9/2001 | Gerber | |
| 6,296,498 B1 | 10/2001 | Ross | |
| 6,299,230 B1 | 10/2001 | Oettl | |
| 6,318,802 B1 | 11/2001 | Sjostrom et al. | |
| 6,325,645 B1 | 12/2001 | Schuite | |
| 6,357,814 B1 | 3/2002 | Boisset et al. | |
| 6,400,259 B1 | 6/2002 | Bourcart et al. | |
| 6,405,988 B1 | 6/2002 | Taylor et al. | |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,083,437 B2 | 8/2006 | Mackness | |
| 7,086,874 B2 | 8/2006 | Mitchell et al. | |
| 7,113,541 B1 | 9/2006 | Lys et al. | |
| 7,159,899 B2 | 1/2007 | Nitschke et al. | |
| 7,170,192 B2 | 1/2007 | Kazmierczak | |
| 7,188,805 B2 | 3/2007 | Henley et al. | |
| 7,207,541 B2 | 4/2007 | Frohnhaus et al. | |
| 7,271,501 B2 | 9/2007 | Dukart et al. | |
| 7,288,009 B2 | 10/2007 | Lawrence et al. | |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |
| 7,363,194 B2 | 4/2008 | Schlick et al. | |
| 7,370,831 B2 | 5/2008 | Laib et al. | |
| 7,388,466 B2 | 6/2008 | Ghabra et al. | |
| 7,389,960 B2 | 6/2008 | Mitchell et al. | |
| 7,416,042 B2 | 8/2008 | Czaykowska et al. | |
| 7,434,883 B2 | 10/2008 | Deptolla | |
| 7,454,170 B2 | 11/2008 | Goossens et al. | |
| 7,455,535 B2 | 11/2008 | Insalaco et al. | |
| 7,503,522 B2 | 3/2009 | Henley et al. | |
| 7,505,754 B2 | 3/2009 | Kazmierczak et al. | |
| 7,523,913 B2 | 4/2009 | Mizuno et al. | |
| 7,556,233 B2 | 7/2009 | Gryp et al. | |
| 7,560,827 B2 | 7/2009 | Jacas-Miret et al. | |
| 7,633,301 B2 | 12/2009 | Steenwyk et al. | |
| 7,661,637 B2 | 2/2010 | Mejuhas et al. | |
| 7,665,939 B1 | 2/2010 | Cardona | |
| 7,739,820 B2 | 6/2010 | Frank | |
| 7,744,386 B1 | 6/2010 | Speidel et al. | |
| 7,980,525 B2 | 7/2011 | Kostin | |
| 7,980,798 B1 | 7/2011 | Kuehn et al. | |
| 8,010,255 B2 | 8/2011 | Darraba | |
| 8,146,991 B2 | 4/2012 | Stanz et al. | |
| 8,278,840 B2 | 10/2012 | Logiudice et al. | |
| 8,282,326 B2 | 10/2012 | Krostue et al. | |
| 8,376,675 B2 | 2/2013 | Schulze et al. | |
| 8,463,501 B2 | 6/2013 | Jousse | |
| 8,536,928 B1 | 9/2013 | Gagne et al. | |
| 8,648,613 B2 | 2/2014 | Ewerhart et al. | |
| 8,702,170 B2 | 4/2014 | Abraham et al. | |
| 8,757,720 B2 | 6/2014 | Hurst, III et al. | |
| 8,800,949 B2 | 8/2014 | Schebaum et al. | |

(56) References Cited

U.S. PATENT DOCUMENTS

| | | |
|---|---|---|
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1* | 5/2019 | Dry .......... B60N 2/14 |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 A2 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

TRACK ASSEMBLY

CROSS-REFERENCE TO RELATED APPLICATIONS

This application is a continuation-in-part of U.S. patent application Ser. No. 16/131,360, filed Sep. 14, 2018, U.S. patent application Ser. No. 16/131,415, filed Sep. 14, 2018, U.S. patent application Ser. No. 16/131,404, filed Sep. 14, 2018, and U.S. patent application Ser. No. 16/131,614, filed Sep. 14, 2018, which is a continuation of U.S. patent application Ser. No. 16/131,384, filed Sep. 14, 2018, the disclosures of which are all hereby incorporated herein by reference in their entireties.

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are all hereby incorporated herein by reference in their entireties.

TECHNICAL FIELD

The present disclosure generally relates to track assemblies, including track assemblies that may be used in connection with vehicles and that may include electrical connectors.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex to use and/or to assemble. For example, track assemblies may involve a complex process and may include many different steps and components. Some track assemblies may not be configured for removably connecting a component or seat to a track.

There is a desire for solutions/options that minimize or eliminate one or more challenges or shortcomings of track assemblies. The foregoing discussion is intended only to illustrate examples of the present field and should not be taken as a disavowal of scope.

SUMMARY

The foregoing and other aspects, features, details, utilities, and/or advantages of embodiments of the present disclosure will be apparent from reading the following description, and from reviewing the accompanying drawings.

In embodiments, a track assembly may include a track and/or a support member. The support member may include a slider and/or an electrical connector. The slider may be configured to move longitudinally to move the electrical connector between a first rotational position and/or a second rotational position. In the first position of the electrical connector, the electrical connector may be in electrical contact with the track. In the second position of the electrical connector, the electrical connector may not be in electrical contact with the track. The electrical connector may include a cam, and/or the cam may be configured to contact the slider. Longitudinal movement of the slider may rotate the cam to move the electrical connector between the first rotational position and/or the second rotational position. The slider may include a first ramped portion and/or a second ramped portion that may be configured to contact the slider.

With embodiments, the second ramped portion may be configured to rotate the cam in a first rotational direction when the slider may move in a first direction. The first ramped portion may be configured to rotate the cam in a second rotational direction when the slider may move in a second direction. The first ramped portion may be substantially curved; and/or the first ramped portion may be configured to rotate the cam at least 90 degrees in the second rotational direction. The second ramped portion may be configured to rotate the cam at least 90 degrees in the first rotational direction. In the first position of the electrical connector, the electrical connector may restrict, at least to some degree, vertical movement of the support member relative to the track. In the second position of the electrical connector, the electrical connector may not substantially restrict vertical movement of the support member relative to the track. The track may include a track conductor that may extend substantially longitudinally along the track. In the first position of the electrical connector, the electrical connector may be configured to electrically connect the support member to the track conductor. The electrical connector may include a body and/or a flange. The body may be substantially hollow, and/or the flange may include an aperture.

The electrical connector may include a contact that may be disposed at least partially in the aperture. The electrical connector may include a biasing member, and/or the biasing member may be configured to bias the contact away from the electrical connector. The support member may be configured to move in a longitudinal direction along the track. The contact may be configured to selectively electrically connect to a track conductor of the track.

A track assembly may include a track and/or a support member. The support member may be configured for selective connection with the track. The support member may include a slider and/or an electrical connector. Displacement of the slider may move the electrical connector between a first position and/or a second position. In the first position of the electrical connector, the electrical connector may be in electrical contact with the track. In the second position of the electrical connector, the electrical connector may not be in electrical contact with the track. The electrical connector may include a flange. The flange may be substantially parallel to a longitudinal direction of the track when the electrical connector is in the second position. The flange may be substantially perpendicular to the longitudinal direction of the track when the electrical connector is in the first position. In the first position of the electrical connector, the support member may be configured to move in the longitudinal direction along the track, and/or vertical movement of the support member may be restricted. In the second position of the electrical connector, the support member may be configured to move in the longitudinal direction along the track; and/or the electrical connector may not substantially restrict vertical movement of the support member. The support member may include a first lever and/or a second lever. Displacement of the slider may move the first lever between a first position and/or a second position. Displacement of the slider may move the second lever between a first position and/or a second position. The first lever may be configured to limit longitudinal movement of the support member along the track. The second lever may be configured to limit longitudinal movement and/or vertical movement of the support member along the track.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
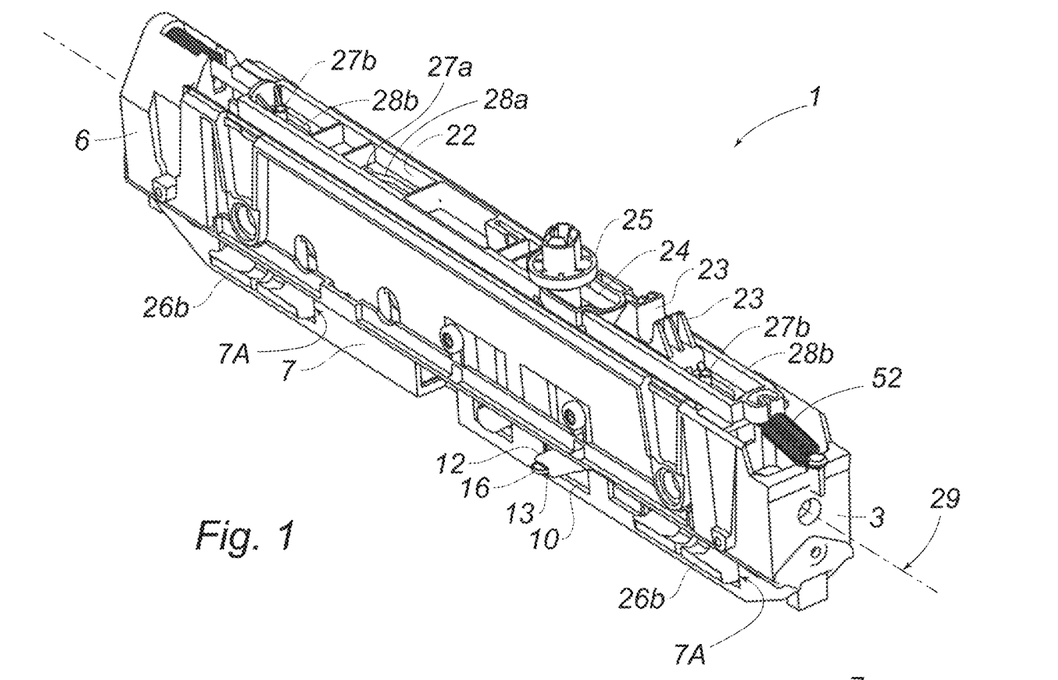
FIG. 1 is a perspective view of a portion of an embodiment of a support member of a track assembly according to teachings of the present disclosure.
Figure 2:
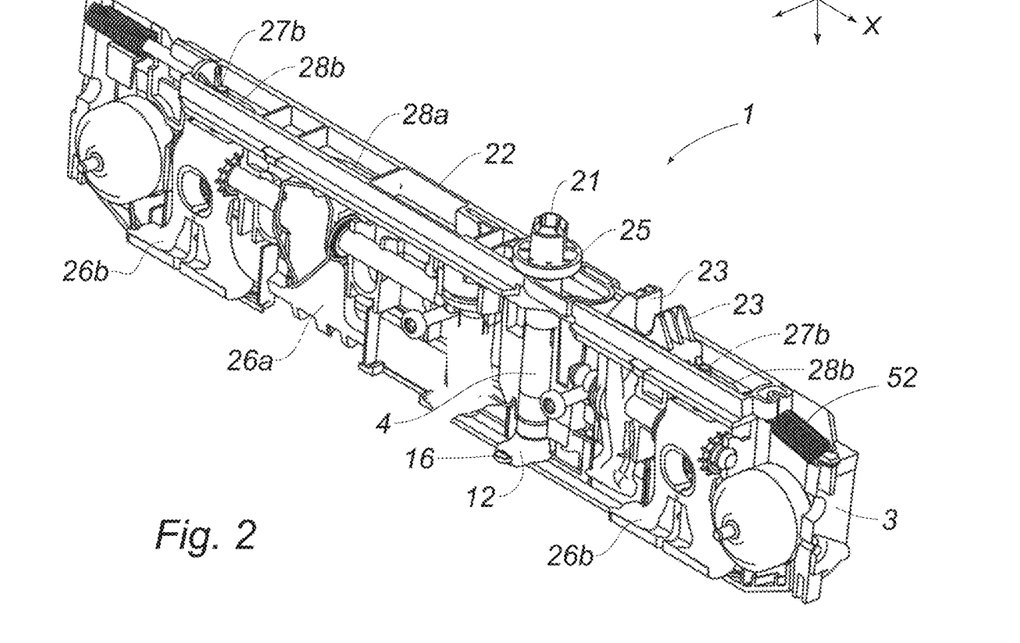
FIG. 2 is a perspective view of a portion of an embodiment of a support member of a track assembly according to teachings of the present disclosure.
Figure 5:
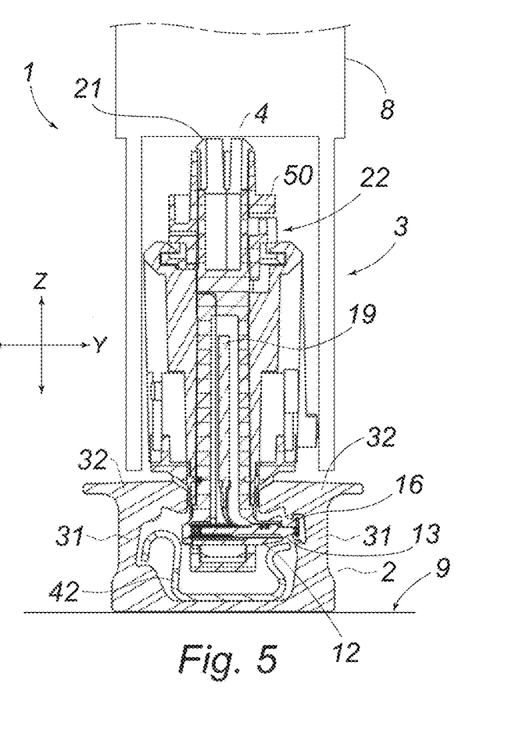
FIGS. 5 and 6 are sectional views of embodiments of track assemblies according to teachings of the present disclosure.
Figure 6:
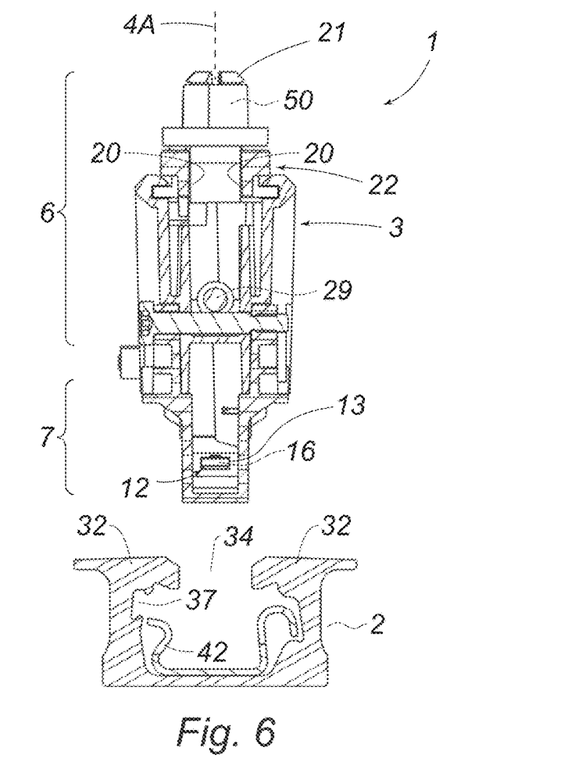

In embodiments, according to FIGS. 1 and 2, the track assembly 1 includes a support member 3 configured to be connected to and/or support a removable component 8 (e.g., a seat, a table, etc.) that may be disposed in a vehicle (see, e.g., FIG. 5). As generally illustrated in FIGS. 5 and 6, a track assembly 1 may include a track 2 that may be connected to a mounting surface 9 (e.g., the floor) of a vehicle. The track assembly 1 may include a support member 3 that may be configured to be selectively connected with a track 2 that may be disposed on the mounting surface 9 of a vehicle. The support member 3 may be configured to mechanically connect to the track 2 and/or electrically connect to the track 2. The track 2 may be configured to supply power to the support member 3 and/or a removable component 8 that may be connected to and/or supported by the support member 3.

Figure 7:
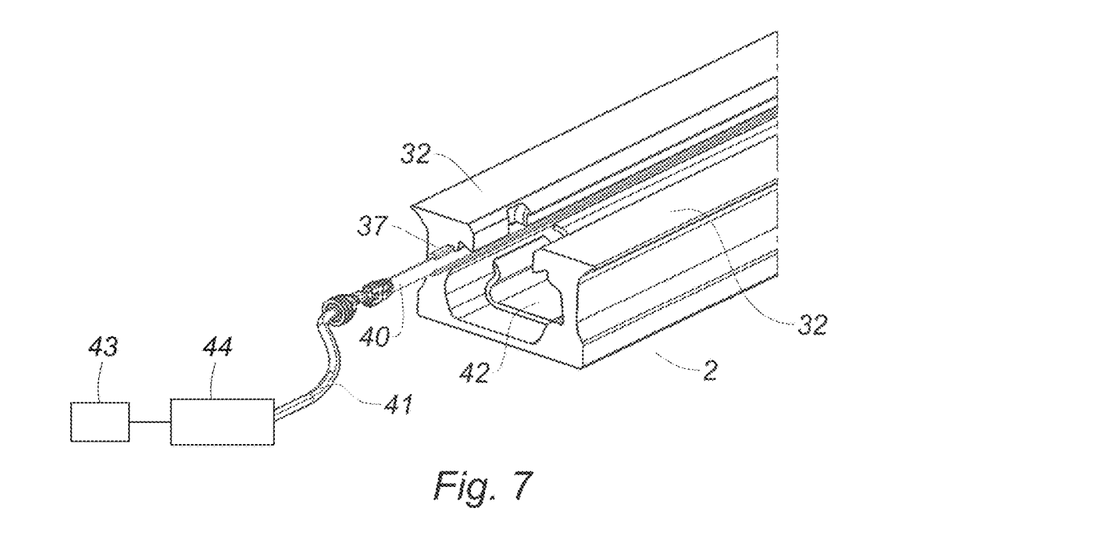
FIG. 7 is a perspective view of embodiments of a track and a conductor according to teachings of the present disclosure.

With embodiments, a support member 3 may include an electrical connector 4. The electrical connector may be configured to selectively electrically connect and/or disconnect the support member 3 and/or the component 8 with the track 2. The track 2 may be connected, at least indirectly (e.g., via an electrical circuit/controller 44), to a power supply 43 (e.g., a battery and/or generator) of a vehicle, such as generally illustrated in FIG. 7.

In embodiments, such as generally illustrated in FIG. 2, the track assembly 1 may include a first lever 26a that may be movable between a first position and a second position. When the first lever 26a is in the first position, the first lever 26a may be configured to limit movement of the support member 3 in the longitudinal direction along the track 2. When the first lever 26a is in the second position, the first lever 26a may not substantially limit movement of the support member 3 in the longitudinal direction along the track 2.

With embodiments, such as generally illustrated in FIGS. 1 and 2, a track assembly 1 may include one or more second levers 26b that may be movable between a first position and a second position. When a second lever 26b is in the first position, the second lever 26b may be configured to limit vertical movement of the support member 3 in the vertical direction relative to the track 2. When the second lever 26b is in the second position, the second lever 26b may not substantially limit movement of the support member 3 in the vertical direction relative to the track 2. The first lever 26a may be configured to engage the track 2 in a first rotational direction, and/or the one or more second levers 26b may be configured to engage the track 2 in a second rotational direction. The first rotational direction may be opposite the second rotational direction. The support member 3 may include one or more windows 10, 14 (e.g., apertures) that the first lever 26a, the second lever 26b, and/or an electrical connector 4 may be configured to pass through when engaging and/or disengaging the first track 2 and/or the insert 42.

With embodiments, the support member 3 may include an upper portion 6 and/or a lower portion 7. The support member 3 may include one or more various materials. For example and without limitation, the support member 3 may include metal and/or plastic. The lower portion 7 may include apertures 7A that may at least partially receive the first lever 26a and/or the second lever 26b.

Figure 3:
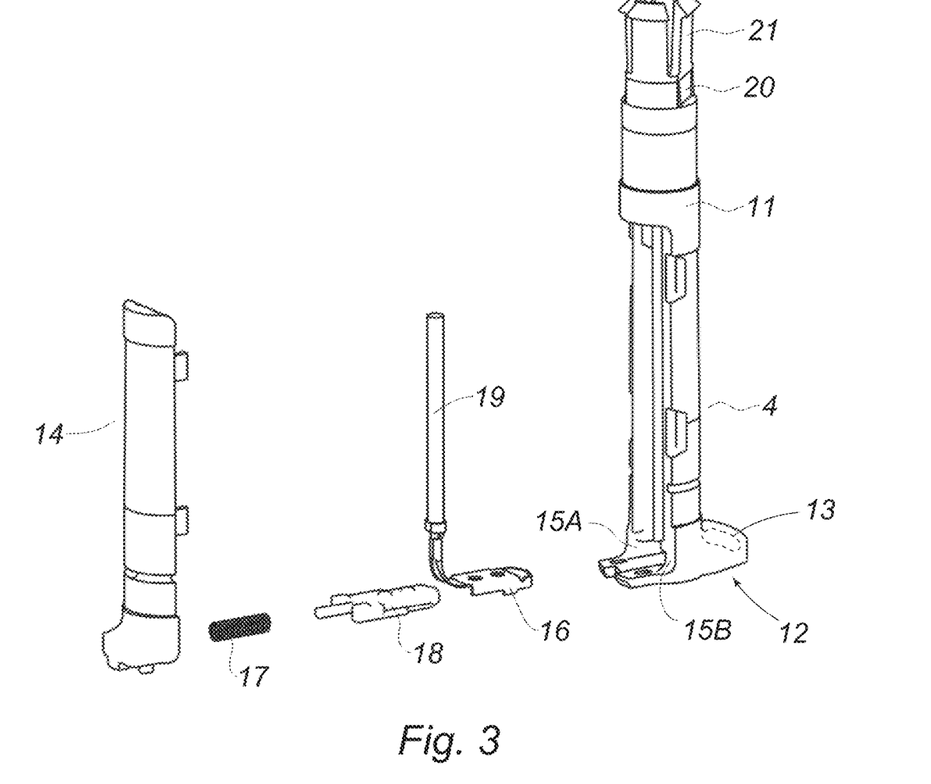
FIG. 3 is an exploded perspective view of an embodiment of an electrical connector according to teachings of the present disclosure.

In embodiments, such as generally illustrated in FIGS. 3, 5, and 6, the support member 3 may include an electrical connector 4. The electrical connector 4 may include a body 11 that may include one or more of a variety of shapes, sizes, and/or configurations. For example, the body 11 may be substantially tubular, cylindrical, and/or hollow. The electrical connector 4 may include a flange 12 that may extend perpendicular to the body 11. The electrical connector 4 may be configured to rotate about an axis that may be substantially parallel to the Z-axis (e.g., substantially vertical). The 4A axis of the electrical connector 4 may be substantially fixed relative to the support member 3. The flange 12 may include a first side 15A and/or a second side 15B. The electrical connector 4 may include a contact 16 that may be configured to move along the first side 15A and/or the second side 15B in a direction substantially parallel to the flange 12. The electrical connector 4 may include a biasing member 17 (e.g., a spring) that may bias the contact 16 in a position where the contact 16 may protrude from an aperture 13 in the flange 12. The electrical connector 4 may include a spacer 18 that may be disposed between the biasing member 17 and the contact 16. The spacer 18 may contact the biasing member 17 and/or the contact 16. The contact 16 may be connected to a conductor 19 that may extend (e.g., substantially vertically) within and/or at least partially through the body 11 of the electrical connector 4. The conductor 19 may electrically connect the contact 16 to the support member 3 and/or a component 8 connected to the support member 3.

Figure 10A:
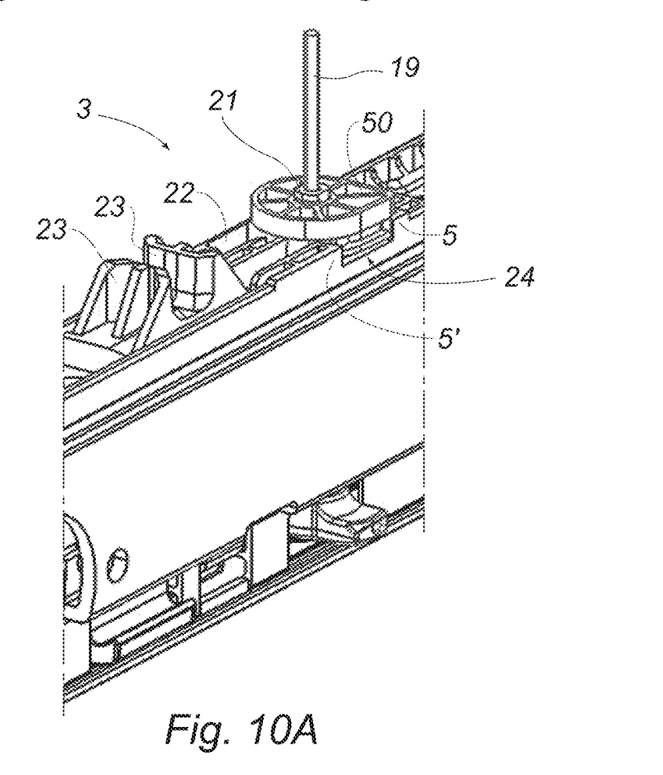
FIG. 10A is a perspective view of portions of an embodiment of a support member of a track assembly according to teachings of the present disclosure.
Figure 10B:
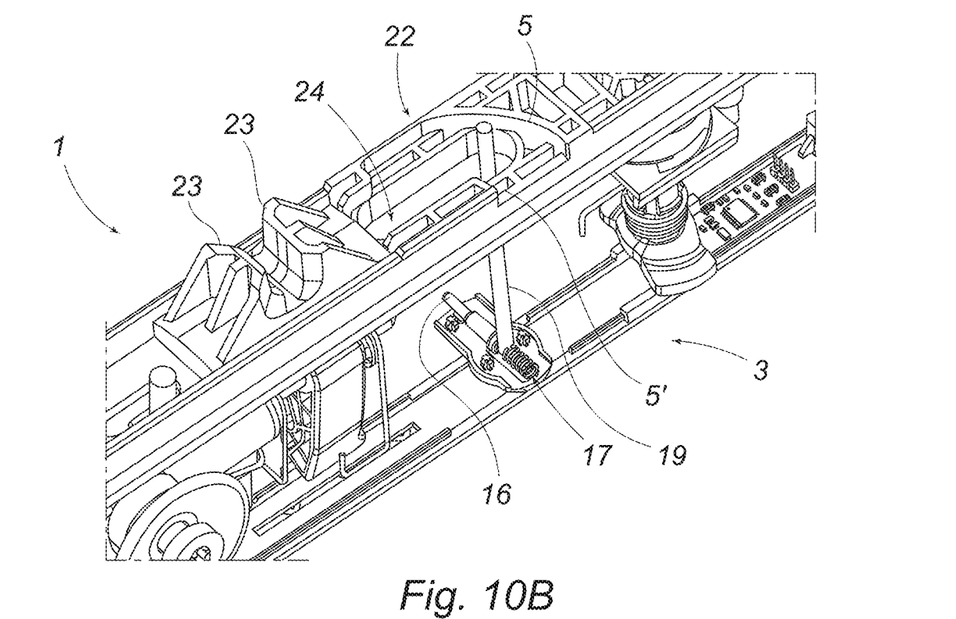
FIG. 10B is a perspective view of portions of an embodiment of a support member of the track assembly according to teachings of the present disclosure.
Figure 10C:
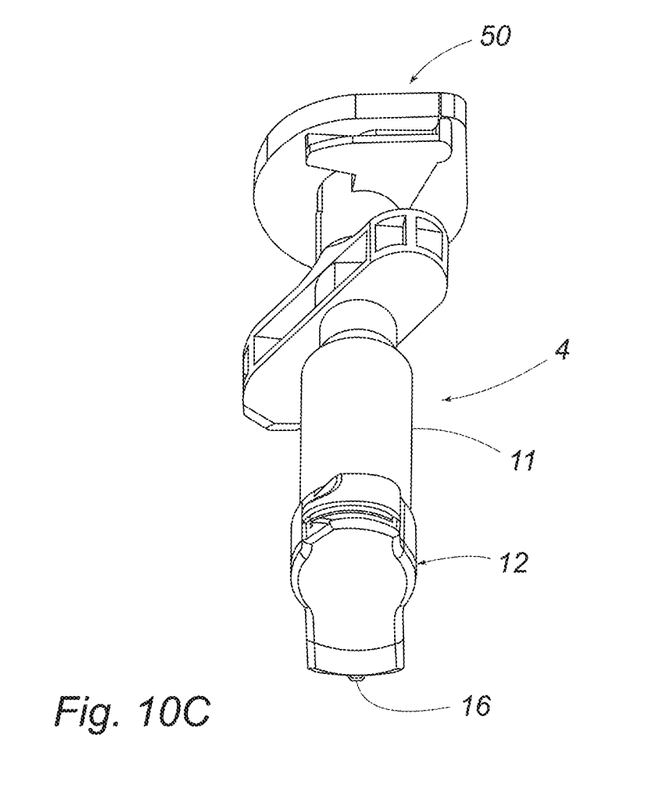
FIG. 10C is a perspective view of an embodiment of an electrical connector of a support member according to teachings of the present disclosure.

With embodiments, the electrical connector 4 may include a connection portion 21 that may connect the electrical connector 4 to a cam 50. The connection portion 21 may include one or more flexible legs that may be selectively connected to the cam 50. The connection portion 21 may include a planar surface 20 that may be at least partially connected the cam 50. The cam 50 may be connected at or about an end (e.g., an upper end) of the body 11 and/or may be connected to the connection portion 21, such as to retain the electrical connector 4 relative to the support member 3. In embodiments, the cam 50 may be formed with the body 11 as a monolithic component, such as a single, unitary component/piece (see, e.g., FIG. 10C).

Figure 4:
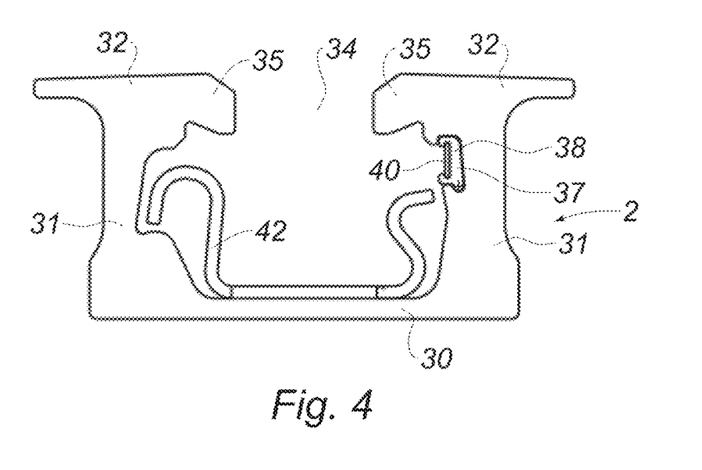
FIG. 4 is a sectional view of an embodiment of a track according to teachings of the present disclosure.

With embodiments, such as generally illustrated in FIG. 4, the track 2 may include a bottom wall 30, two side walls 31, and/or two wings 32. The side walls 31 and/or the wings 32 may be disposed such that a gap 34 may be present between the side walls 31 and/or the wings 32. The track 2 may include one or more of a variety of materials. For example and without limitation, the track 2 may be formed of an extruded metal and/or composite metal. The wings 32 may each include a chamfered portion 35 that may be substantially ramp-shaped. At least one of the side walls 31 may include a groove 37 that may be configured to retain an insulator 38 and/or a track conductor 40. The insulator 38 may include one or more of a variety of materials. For example and without limitation, the insulator 38 may include a non-electrically conductive material (e.g., rubber, plastic, etc.). The track conductor 40 may include one or more of a variety of materials. For example and without limitation, the track conductor 40 may include any type of electrically conductive material (e.g., copper, stainless steel, etc.). The track conductor 40 may be connected to an electrical circuit 44 of the vehicle via a conductive wire 41 (see, e.g., FIG. 7). The track assembly 1 may include an insert 42 that may be configured to receive and/or engage with the first lever 26a, and/or may facilitate in limiting movement of the support member 3 in the longitudinal direction. For example and without limitation, in a first position of the first lever 26a, the first lever 26a may engage the insert 42 to restrict and/or substantially prevent longitudinal movement of the support member 3 relative to the track 2 and/or the insert 42.

In embodiments, such as generally illustrated in FIGS. 1, 2, 5, 6, and 8, the support member 3 may include a slider 22. The slider 22 may be configured to move the electrical connector 4, the first lever 26a, and/or the one or more second levers 26b. For example and without limitation, movement of the slider 22, such as in the X-direction, may move (e.g., rotate) the electrical connector 4, the first lever 26a, and/or the second levers 26b. The slider 22 may be configured to unlock and/or lock the first lever 26a, the second levers 26b, and/or the electrical connector 4 with respect to the track 2. The slider 22 may be configured to move the first lever 26a such that the first lever 26a may selectively limit movement of the support member 3 in the X-direction. The slider 22 may be configured to move the second lever 26b such that the second levers 26b may selectively limit movement of the support member 3 in the Z-direction (e.g., for removing the support member 3 from the track 2).

With embodiments, the slider 22 may be disposed at and/or connected to the upper portion 6 of the support member 3 (e.g., the slider 22 may be disposed on an upper face of the support member 3). The slider 22 may move in the X-direction relative to the support member 3. The slider 22 may include one or more hooks 23 that may be configured to engage an actuator (see, e.g., FIGS. 1, 2, 10A, and 10B). The actuator (e.g., a strap, cable, lever, etc.) may be configured to move the slider 22 in the X-direction.

In embodiments, such as generally illustrated in FIGS. 8, 10A, 10B, and 10C, the slider may include an aperture 24 that may be configured to receive at least a portion of the electrical connector 4. The aperture 24 may include one or more of a variety of shapes, sizes, and/or configurations. For example and without limitation, the aperture 24 may be substantially oval-shaped and/or oblong. The body 11 of the electrical connector 4 may be disposed at least partially in the aperture 24. The slider 22 may include a first ramped portion 5 and a second ramped portion 5' that may extend from an edge of the slider 22. The ramped portions 5, 5' may include one or more of a variety of shapes, sizes, and/or configurations. For example and without limitation, the first ramped portion 5 may be substantially curved and/or rounded; and/or the second ramped portion 5' may be substantially planar. The ramped portions 5, 5' may be configured to contact and/or rotate the cam 50 that may be connected to the electrical connector 4.

In embodiments, the electrical connector 4 may include a first/engaged position and a second/disengaged position. In the first position of the electrical connector 4, the flange 12 may be substantially perpendicular to the longitudinal direction of the track 2 (e.g., the flange 12 may extend substantially in the Y-direction). When the electrical connector 4 is in the first position, the flange 12 may extend transversely (e.g., in the Y-direction) from the lower portion 7 of the support member 3 and/or the flange 12 may extend through an aperture 7A of the lower portion 7 and may contact and/or engage the track conductor 40. In the first position of the electrical connector 4, at least a portion of the electrical connector 4 may be disposed below at least a portion of a wing 32 of the track 2 such that the electrical connector 4 may, at least to some degree, limit movement of the support member 3 in the Z-direction. In the second position of the electrical connector 4, the flange 12 may be substantially parallel to the longitudinal direction of the track 2. When the electrical connector 4 is in the second position, the flange 12 may not extend through the aperture 7A of the lower portion 7 of the support member 3, the electrical connector 4 may not engage and/or contact the track conductor 40, and/or the electrical connector may not substantially restrict movement of the support member 3 relative to the track 2. When moving between the first position and the second position, the electrical connector 4 may, for example and without limitation, move such that the flange 12 may rotate about 90 degrees or more or less.

With embodiments, if the slider 22 is moved in a first X-direction, the second ramped portion 5' may contact the cam 50 which may rotate the electrical connector 4 in a first rotational direction, such as from the first position toward the second position. If the slider 22 is moved in a second X-direction, the first ramped portion 5 may contact the cam 50, which may rotate the electrical connector 4 in a second rotational direction, such as from the second position toward the first position. The slider 22 and/or the support member 3 may include a biasing member 52 that may bias the slider 22 toward the second X-direction, which may bias the cam 50 in the second rotational direction. If a force applied to move the slider 22 is greater than the force of the biasing member 52, the slider 22 may slide in the first X-direction, and the ramped portion 5 may rotate the cam 50 such that electrical connector 4 moves from the first position to the second position.

With embodiments, the slider 22 may be connected to and/or in contact with, at least in some positions, the first lever 26a, the second lever 26b, and/or the electrical connector 4. The first lever 26a and/or the second lever 26b may rotate about an axis 29 that may be aligned substantially in an X-direction. The first lever 26a may include a first protrusion 27a that may be configured to engage the slider 22, and/or the second lever 26b may include a second protrusion 27b that may be configured to engage the slider 22. The slider 22 may include a first channel 28a and/or a second channel 28b that may be configured to contact the first protrusion 27a and/or the second protrusion 27b, respectively. The first channel 28a and/or the second channel 28b may, for example and without limitation, include apertures, grooves, slots, and/or apertures. Movement of the slider 22 may cause contact between the first channel 28a and the first protrusion 27a, and/or the second channel 28b and the second protrusion 27b, which may rotate the first lever 26a and/or the second lever 26b. If the slider 22 is moved in the X-direction, the first channel 28a may contact the first protrusion 27a, which may cause the first lever 26a to rotate between a first rotational position (e.g., an engaged position) and a second rotational position (e.g. a disengaged position). If the slider 22 is moved in the longitudinal direction, the second channel 28b may contact the second protrusion 27b which may cause the second lever(s) 26b to rotate between a first rotational position (e.g., an engaged position) and a second rotational position (e.g., a disengaged position).

In embodiments, the slider 22 may include a first slider position, a second slider position, and/or a third slider position. If the slider 22 is in the first slider position, the first lever 26a may restrict movement of the support member 3 relative to the track 2 in the longitudinal direction (X-direction), and/or the second lever(s) 26b may restrict movement of the support member 3 in the vertical direction (Z-direction) relative to the track 2. If the slider 22 is in the second slider position, the first lever 26a may not substantially restrict movement of the support member 3 relative to the track 2 in the longitudinal direction (X-direction), and/or the second lever(s) 26b may restrict movement of the support member 3 in the vertical direction (Z-direction) relative to the track 2. If the slider 22 is in the third slider position, the first lever 26a may not substantially restrict movement of the support member 3 relative to the track 2 in the longitudinal direction (X-direction), and/or the second lever(s) 26b may not substantially restrict movement of the support member 3 in the vertical direction (Z-direction) relative to the track 2 (e.g., the support member 3 may be removed from the track 2).

With embodiments, if the slider 22 is in the first slider position, the electrical connector 4 may be in a first rotational position and/or may electrically connect the support member 3 to the track 2. If the slider 22 is in the second slider position and/or the third slider position, the electrical connector 4 may be in a second rotational position and/or may electrically connect the support member 3 to the track 2.

Figure 8:
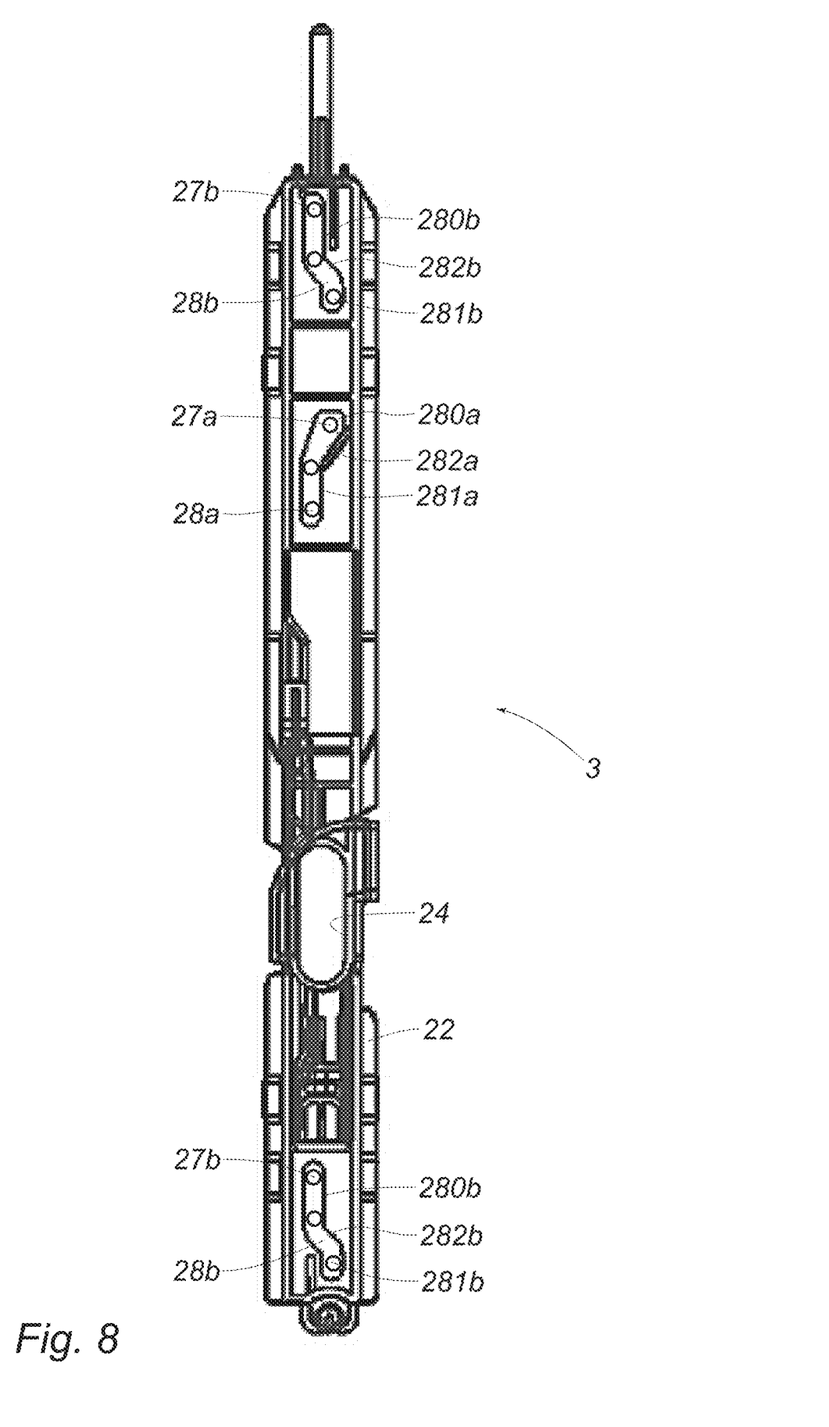
FIG. 8 is a top sectional view of an embodiment of a support member including a slider according to teachings of the present disclosure.
Figures 9A, 9B:
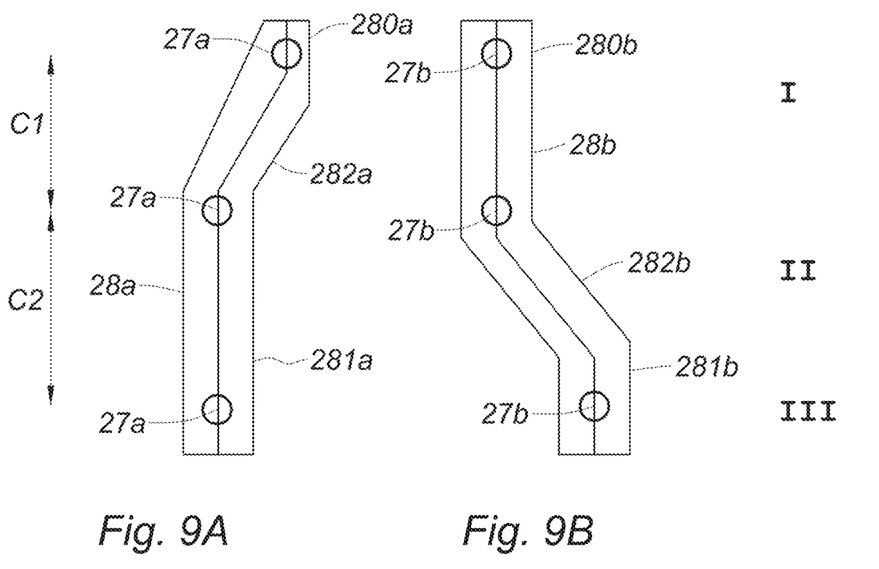
FIGS. 9A and 9B are top views of embodiments of a channel and a second channel of a slider according to teachings of the present disclosure.

With embodiments, such as generally illustrated in FIGS. 8 and 9A, the first channel 28a may include a first portion 280a, a second portion 282a, and/or a third portion 281a. The first portion 280a and/or the third portion 281a may extend substantially in the longitudinal direction (X-direction). The first portion 280a and the third portion 281a may be connected via the second portion 282a. The second portion 282a may be disposed in an oblique angle relative to the first portion 280a and/or the third portion 281a. The first portion 280a may be offset from the third portion 281a in the X-direction and/or the Y-direction. The first channel 28a may be configured to contact the first protrusion 27a of the first lever 26a. The slider 22 may move from the first slider position to the second slider position, which may cause the second portion 282a of the first channel 28a to move the first lever 26a from the first rotational position to the second rotational position, which may move the first lever 26a from the first position to the second position (e.g., the first lever 26a may move from a position of limiting movement of the support member 3 in the X-direction to a position where the first lever 26a does not substantially limit movement of the support member 3 in the X-direction). Movement of the slider 22 between the second slider position and the third slider position may not cause rotation of the first lever 26a.

In embodiments, such as generally illustrated in FIGS. 8 and 9B, the second channel 28b may include a first portion 280b, a second portion 282b, and/or a third portion 281b. The first portion 280b and/or the third portion 281b may extend substantially in the longitudinal direction (X-direction). The first portion 280a and the third portion 281a may be connected via the second portion 282b. The second portion 282b may be disposed at an oblique angle relative to the first portion 280b and the second portion 282b. The first portion 280b may be offset from the third portion 281b in the X-direction and/or the Y-direction. The second channel 28b may be configured to contact the second protrusion 27b of the second lever 26b to selectively actuate/rotate the second lever 26b. The slider 22 may move from the first slider position to the second slider position, which may not cause movement of the second lever 26b. The slider 22 may move from the second slider position to the third slider position, which may cause the second portion 282a of the first channel 28a to move the second lever 26b from the first position to the second position (e.g., the second lever 26b may move from a position of limiting movement of the support member 3 in the Z-direction to a position where the second lever 26b does not substantially limit movement of the support member 3 in the Z-direction).

With embodiments, such as generally illustrated in FIGS. 9A and 9B, movement of the slider 22 between the first slider position and the second slider position may be represented by a first slider stroke C1. Movement of the slider 22 between the second slider position and the third slider position may be represented by a second slider stroke C2. Moving the slider 22 along the first slider stroke C1 may cause rotation of the first lever 26a and the electrical connector 4, such as without causing rotating of the second lever(s) 26b. Moving the slider 22 along the second stroke C2 may cause rotation of the second lever 26b, such as without causing rotation of the first lever 26a and/or the electrical connector 4.

With embodiments, such as generally shown in FIGS. 5 and 6, the support member 3 may selectively engage the track 2. When the slider 22 may be in the first slider position, the electrical connector 4 may be in the first position and/or engaged with the track 2 (see, e.g., FIG. 5). In the first position of the electrical connector 4, the flange 12 may extend substantially in the Y-direction and/or may be electrically connected to the track conductor 40. When the slider 22 is in the first slider position, the lower portion 7 of the support member may be disposed in the gap 34 of the track 2. The biasing member 17 may facilitate continuous connection at all points along the track conductor 40 despite possible dimensional dispersions of the track 2 and/or the track assembly 1. If the slider 22 is moved to the second slider position (or the third slider position), the first lever 26a may not substantially restrict longitudinal movement of the support member 3, and/or the support member 3 may move without substantial limitation in the longitudinal direction. Moving the slider 22 to the second slider position may rotate the electrical connector 4 and/or the first lever 26a out of engagement with the track 2. If the slider 22 is moved to the third slider position, the first lever 26a, the second lever(s) 26b, and/or the electrical connector 4 may not substantially restrict movement of the support member 3, and/or the support member 3 may move without substantial limitation in the Z-direction (or the X-direction) such that the support member 3 may be inserted into and/or removed from the track 2 (see, e.g., FIG. 6). Moving the slider 22 to the third slider position may rotate the second lever 26b out of engagement with the track 2. The lower portion 7 of the support member 3 may move vertically from the gap 34 when the second lever 26b is in the second position (e.g., the second lever 26b may not limit vertical movement of the support member 3 when in the second position).

In embodiments, the support member 3 may be inserted into the track 2 by moving the slider 22 to the third slider position. Once the support member 3 is inserted into the track 2, the slider 22 may be moved to the second slider position and/or to the first slider position to couple the support member 3 with the track 2. In moving the slider 22 from the third slider position to the first slider position, the second lever 26b engages the track 2 first, and then the first lever 26a and the electrical connector 4 may engage the track 2.

Figure 11:
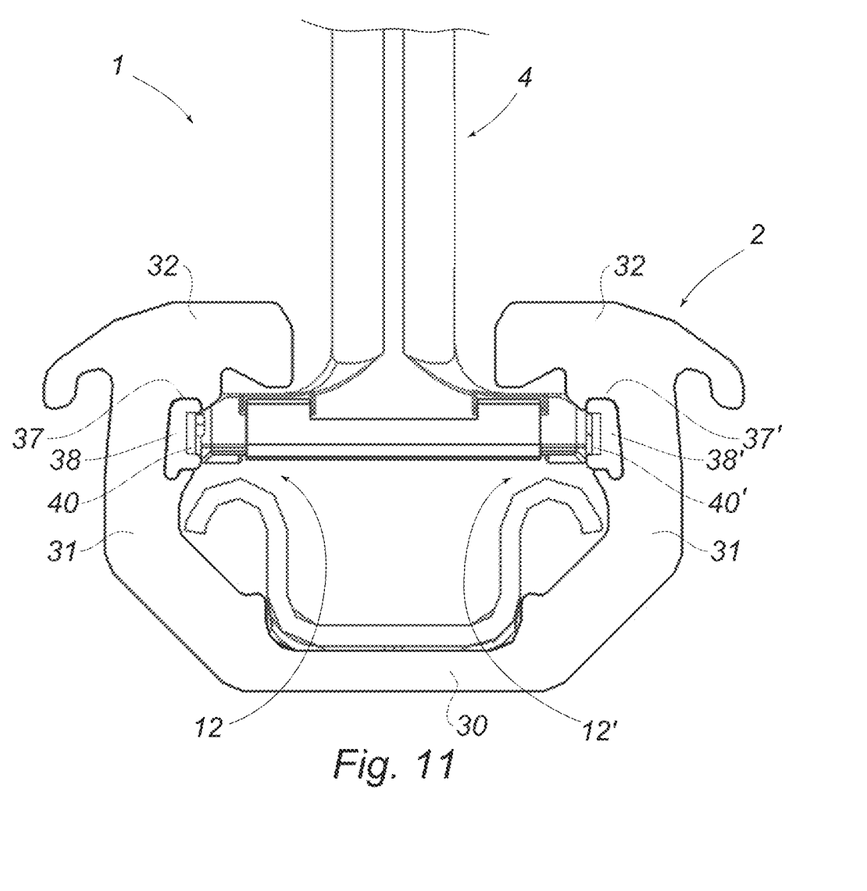
FIG. 11 is a sectional view of portions of an embodiment of a track assembly according to teachings of the present disclosure.

In embodiments, such as generally illustrated in FIG. 11, the electrical connector 4 may include a flange 12 and a second flange 12'. The second flange 12' may include similar configuration as the flange 12, and/or the second flange 12' may extend in a direction perpendicular to the body 11, such as in a direction opposite of the flange 12. The flanges 12, 12' may extend from opposite sides of the body 11 of the electrical connector 4. For example and without limitation, the body 11 and the flanges 12, 12' may form a substantially inverted T-shape. The track 2 may include a second groove 37', a second insulator 38', and/or a second track conductor 40' that may be configured in the same or a similar manner as the groove 37, the first insulator 38, and/or the track conductor 40. The second groove 37', the second insulator 38', and/or the second track conductor 40' may be disposed opposite (e.g., connected to and/or included with the other side wall 31) the groove 37, the second insulator 38, and/or the track conductor 40.

In embodiments, a vehicle may include one or more track assemblies 1. A component/seat 8 may be connected to the support member 3. A support member 3 may connect to more than one track 2, such as to a pair of tracks 2 that may be substantially parallel.

It should be understood that while embodiments of track assemblies 1 may be described herein in connection with vehicles and/or seats, track assemblies 1 may be utilized in connection with a wide variety of applications that may or may not include vehicles and/or seats.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly, comprising:
a track; and
a support member, including:
a slider; and
an electrical connector;
wherein the slider is configured to move longitudinally to move the electrical connector between a first rotational position and a second rotational position;
in the first position of the electrical connector, the electrical connector is in electrical contact with the track; and
in the second position of the electrical connector the electrical connector is not in electrical contact with the track.

2. The track assembly of claim 1, wherein the electrical connector includes a cam, and the cam is configured to contact the slider.

3. The track assembly of claim 2, wherein longitudinal movement of the slider rotates the cam to move the electrical connector between the first rotational position and the second rotational position.

4. The track assembly of claim 3, wherein the slider includes a first ramped portion and a second ramped portion configured to contact the slider.

5. The track assembly of claim 4, wherein the second ramped portion is configured to rotate the cam in a first rotational direction when the slider moves in a first direction; and the first ramped portion is configured to rotate the cam in a second rotational direction when the slider moves in a second direction.

6. The track assembly of claim 5, wherein the first ramped portion is substantially curved and the first ramped portion is configured to rotate the cam at least 90 degrees in the second rotational direction.

7. The track assembly of claim 6, wherein the second ramped portion is configured to rotate the cam at least 90 degrees in the first rotational direction.

8. The track assembly of claim 5, wherein in the first position of the electrical connector, the electrical connector restricts, at least to some degree, vertical movement of the support member relative to the track; and in the second position of the electrical connector, the electrical connector does not substantially restrict vertical movement of the support member relative to the track.

9. The track assembly of claim 1, wherein the track includes a track conductor extending substantially longitudinally along the track.

10. The track assembly of claim 9, wherein in the first position of the electrical connector, the electrical connector is configured to electrically connect the support member to the track conductor.

11. The track assembly of claim 1, wherein the electrical connector includes a body and a flange; the body is substantially hollow; and the flange includes an aperture.

12. The track assembly of claim 11, wherein the electrical connector includes a contact disposed at least partially in the aperture.

13. The track assembly of claim 12, wherein the electrical connector includes a biasing member; and the biasing member is configured to bias the contact away from the electrical connector.

14. The track assembly of claim 13, wherein the support member is configured to move in a longitudinal direction along the track; and the contact is configured to selectively electrically connect to a track conductor of the track.

15. A track assembly, comprising:
a track; and
a support member configured for selective connection with the track, the support member including:
a slider; and
an electrical connector;
wherein displacement of the slider in a longitudinal direction of the track moves the electrical connector between a first position and a second position;
in the first position of the electrical connector, the electrical connector is in electrical contact with the track; and
in the second position of the electrical connector, the electrical connector is not in electrical contact with the track.

16. A track assembly, comprising:
a track; and
a support member configured for selective connection with the track, the support member including:
a slider; and
an electrical connector;
wherein displacement of the slider moves the electrical connector between a first position and a second position;
in the first position of the electrical connector, the electrical connector is in electrical contact with the track; and
in the second position of the electrical connector, the electrical connector is not in electrical contact with the track;
the electrical connector includes a flange;
the flange is substantially parallel to a longitudinal direction of the track when the electrical connector is in the second position; and
the flange is substantially perpendicular to the longitudinal direction of the track when the electrical connector is in the first position.

17. The track assembly of claim 16, wherein in the first position of the electrical connector, (i) the support member is configured to move in the longitudinal direction along the track, and (ii) vertical movement of the support member is restricted.

18. The track assembly of claim 17, wherein in the second position of the electrical connector, the support member is configured to move in the longitudinal direction along the track and the electrical connector does not substantially restrict vertical movement of the support member.

19. The track assembly of claim 15, wherein the support member includes a first lever and a second lever; displacement of the slider moves the first lever between a first lever first position and a first lever second position; and displacement of the slider moves the second lever between a second lever first position and a second lever second position.

20. The track assembly of claim 19, wherein the first lever is configured to limit longitudinal movement of the support member along the track; and the second lever is configured to limit longitudinal movement and vertical movement of the support member along the track.

* * * * *